US010899371B2

(12) United States Patent
Lequio et al.

(10) Patent No.: US 10,899,371 B2
(45) Date of Patent: Jan. 26, 2021

(54) SYSTEM FOR MANAGING SPACE AVAILABLE AND SEATS FOR PASSENGERS FOR USE OF A PASSENGER TRANSPORT SYSTEM

(71) Applicant: ITALDESIGN-GIUGIARO S.p.A., Turin (IT)

(72) Inventors: Marziella Lequio, Peveragno (IT); Marco Bergero, Turin (IT)

(73) Assignee: ITALDESIGN-GIUGIARO S.P.A., Turin (IT)

( * ) Notice: Subject to any disclaimer, the term of this patent is extended or adjusted under 35 U.S.C. 154(b) by 225 days.

(21) Appl. No.: 16/166,241

(22) Filed: Oct. 22, 2018

(65) Prior Publication Data

US 2019/0118838 A1 Apr. 25, 2019

(30) Foreign Application Priority Data

Oct. 24, 2017 (IT) .................. 102017000120686

(51) Int. Cl.
| | |
|---|---|
| *B61D 41/04* | (2006.01) |
| *G06Q 50/30* | (2012.01) |
| *G06Q 10/02* | (2012.01) |
| *B60N 2/00* | (2006.01) |
| *B61L 15/00* | (2006.01) |
| *B61L 27/00* | (2006.01) |

(52) U.S. Cl.
CPC ............. *B61D 41/04* (2013.01); *B60N 2/002* (2013.01); *B61L 15/0027* (2013.01); *B61L 15/0072* (2013.01); *B61L 15/0081* (2013.01); *B61L 27/0077* (2013.01); *G06Q 10/02* (2013.01); *G06Q 50/30* (2013.01)

(58) Field of Classification Search
CPC ..... B61D 41/04; B60N 2/002; B61L 15/0027; B61L 15/0072; B61L 15/0081; B61L 27/0077; G06Q 10/02; G06Q 50/30
See application file for complete search history.

(56) References Cited

U.S. PATENT DOCUMENTS 6,490,515 B1 * 12/2002 Okamura ........... G01G 19/4142
701/49
2002/0069017 A1 * 6/2002 Schmier ................ G08G 1/123
701/469

(Continued)

FOREIGN PATENT DOCUMENTS

| EP | 2011712 A1 | 1/2009 |
| EP | 2738060 A1 | 6/2014 |

*Primary Examiner* — Calvin Cheung
(74) *Attorney, Agent, or Firm* — Arent Fox LLP; Michael Fainberg

(57) ABSTRACT

A system for managing space available and seats for passengers in a passenger transportation system comprising at least one train including a plurality of cars, each car having a corresponding predetermined number of seats, is described. The system comprises sensors for sensing the occupancy of the space available to passengers, a processor for managing the space available to passengers, and display devices for displaying the availability of free space for passengers, capable of signaling the availability of free space for passengers or signaling the unavailability of free space for passengers in a different first or second signaling mode, in connection with each predetermined section of the train.

16 Claims, 5 Drawing Sheets

(56) References Cited

U.S. PATENT DOCUMENTS

| | | | |
|---|---|---|---|
| 2009/0063208 A1* | 3/2009 | Stirlen | G06Q 10/02 705/6 |
| 2009/0320713 A1* | 12/2009 | Amiri | B62D 55/06 104/281 |
| 2011/0082714 A1* | 4/2011 | Gaikwad | G06Q 10/02 705/5 |
| 2011/0148648 A1* | 6/2011 | Fischer | B60R 21/01532 340/686.6 |
| 2011/0163767 A1* | 7/2011 | Chen | B60R 21/01532 324/679 |
| 2012/0010913 A1* | 1/2012 | Lele | G06Q 10/02 705/5 |
| 2013/0054279 A1* | 2/2013 | Sharp | G06Q 10/02 705/5 |
| 2013/0060585 A1* | 3/2013 | Hornbaker | G06Q 10/02 705/5 |
| 2013/0231965 A1 | 9/2013 | Tokatly | |
| 2013/0268303 A1* | 10/2013 | Messier | G06Q 50/30 705/5 |
| 2014/0125355 A1* | 5/2014 | Grant | G01R 27/2605 324/629 |
| 2014/0163860 A1* | 6/2014 | Chiantera | G06Q 30/06 701/400 |
| 2014/0257879 A1* | 9/2014 | Sink | G06Q 10/02 705/5 |
| 2015/0095073 A1* | 4/2015 | Li | G06Q 10/025 705/6 |
| 2015/0239561 A1* | 8/2015 | Hau | G06Q 10/08 715/771 |
| 2015/0239573 A1* | 8/2015 | Jouper | B64D 11/06 701/3 |
| 2017/0169671 A1* | 6/2017 | Kaura | G08B 5/221 |
| 2017/0200082 A1* | 7/2017 | Bohm | G06Q 10/06 |
| 2017/0200355 A1* | 7/2017 | Gruenbaum | H04B 5/0031 |
| 2017/0233098 A1* | 8/2017 | Gerard | B64D 45/0059 348/159 |

* cited by examiner

SYSTEM FOR MANAGING SPACE AVAILABLE AND SEATS FOR PASSENGERS FOR USE OF A PASSENGER TRANSPORT SYSTEM

CROSS-REFERENCE TO RELATED APPLICATIONS

This application claims priority to Italian Patent Application No. 102017000120686 filed on Oct. 24, 2017, the entire contents of which is hereby incorporated by reference.

FIELD OF TECHNOLOGY

The present disclosure relates generally to the field of passenger transport, and more specifically to systems and methods for managing space available and seats for passengers for use of a passenger transport system.

BACKGROUND

The present disclosure i relates to passenger transport services and systems, such as public transportation systems, and especially transportation systems based on the circulation of trains of vehicles such as railway cars.

More specifically, the purpose of the present disclosure is a system for managing space available and seats for passengers for use of a transportation service, such as in a public transportation system, according to the preamble of claim 1.

Generally, a passenger transportation system including a plurality of trains of cars in transit over one or more urban or suburban transportation lines allows for the transportation of a large number of passengers per train. The individual cars in a train may communicate with or be separate from each other, and each car has a predetermined number of seats and a predetermined amount of free space for standing passengers.

It is not uncommon for there to be some cars in a train, such as a metropolitan railway train, that are more crowded (usually in proximity to the access points of stop stations) where no seats are available, and others that are less crowded (usually at the ends of the train) where some seats are available.

It would be desirable for passengers accessing a train, especially passengers who need to sit or simply wish to sit, to be able to access a car in a train where space is available to stand or at least to sit, respectively. Often, however, reaching a car with available space or open seats after boarding a train may not be possible if the cars in the train do not communicate, or it may be very difficult if one has to pass through crowded cars. In the present description, free space is understood as a space predetermined according to a predefined criterion, deemed suitable to accommodate a standing passenger given the average outline of the shape of a passenger and the optimum distance between passengers.

The purpose of the present disclosure is to provide a satisfactory solution to the aforementioned problem.

According to this disclosure, this goal is achieved thanks to a system for managing space available and seats for passengers in a transportation system, said system having the features of claim 1.

The subject matter of the dependent claims addresses particular aspects and is to be considered an integral part of this description.

SUMMARY

In summary, the present disclosure is based on the principle of making a system for managing space available to passengers and availability of seats for passengers in a passenger transportation system that is capable of continuously monitoring the availability of free space for standing passengers and possibly seats in the various cars of a passenger transportation train, and indicating said availability to passengers waiting to board the cars of the train so that the passengers can arrange themselves and go to or towards the car with free space and/or free seats right away.

In a preferred aspect, the system of the disclosure also makes it possible to make an advance reservation of a seat in a car of a train, to guide the passenger to the reserved seat, and to make said seat available by a consent signal or an unlocking command coming from the passenger holding a reservation.

BRIEF DESCRIPTION OF THE DRAWINGS

Additional features and benefits of the disclosure will be described in greater detail in the following detailed description of an aspect of the present disclosure, given as a non-limiting example, in reference to the appended drawings, in which.

DETAILED DESCRIPTION

Figure 1:
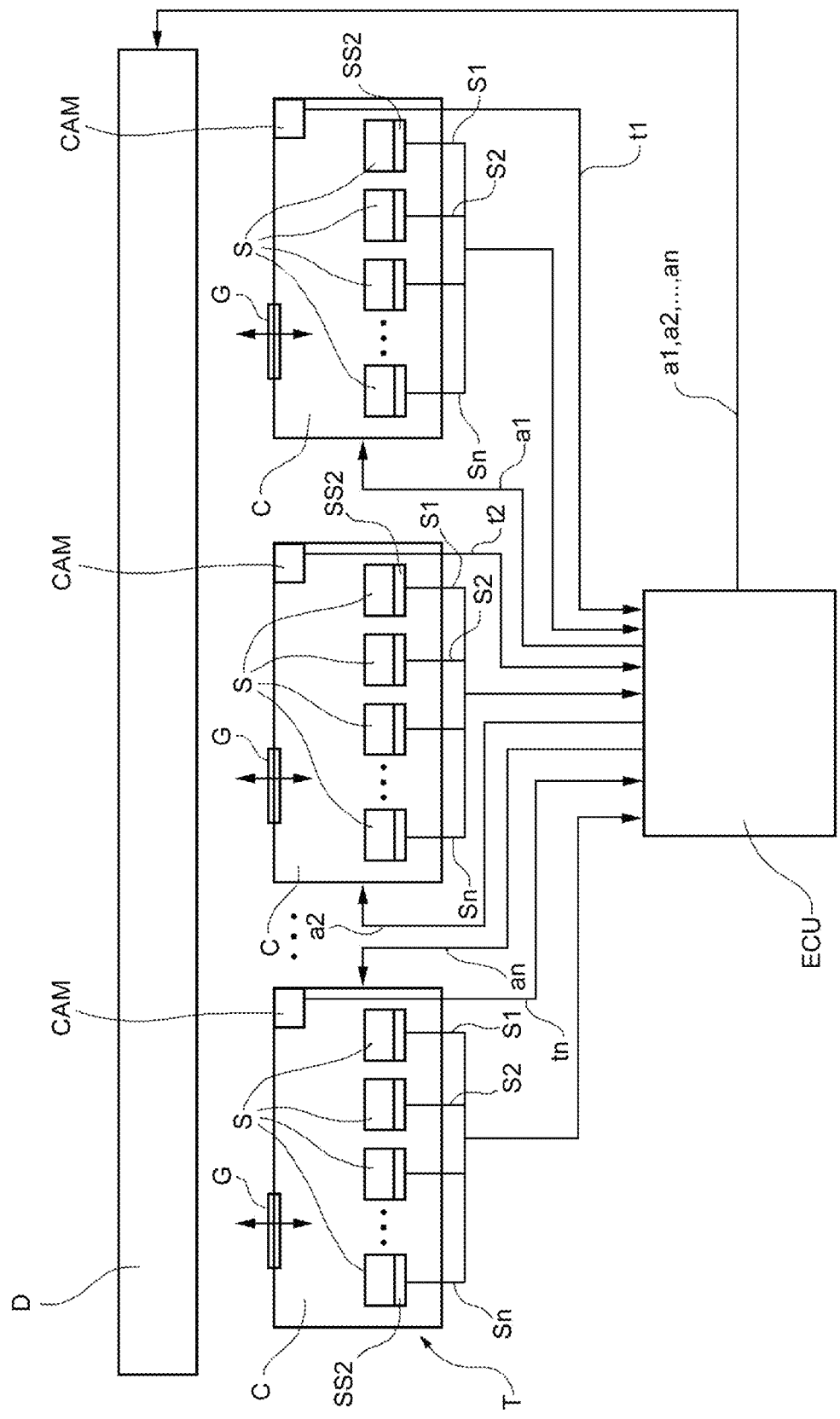
FIG. 1 shows a schematic diagram of a system for managing space available to passengers and the availability of seats in a passenger transportation system referred to by the present disclosure.

In a purely schematic form, FIG. 1 shows a system for managing space available to passengers and availability of seats in a transportation system referred to by the present disclosure. The system comprises at least one passenger transport train T including a plurality of cars C (three of which are shown as an example in the figure), each of which has its predetermined free space for standing passengers and corresponding sensor for sensing whether the space available to passengers is occupied, capable of transmitting corresponding signals on the occupancy of available space in a car. Said sensor include for example recorder CAM for the inside of the car installed for this purpose within the car or in place for a safety and video-surveillance system, placed so as to monitor the occupancy and use of the inside space of the car, and capable of transmitting a corresponding image signal t1, t2, . . . , tn. Each car is equipped with a predetermined number of seats S with associated sensors SS2 for sensing the occupancy of the seat, capable of transmitting corresponding occupancy signals s1, s2, . . . , sn indicating the occupied or free status of the corresponding seat.

The system also comprises processor ECU for managing space available to passengers (possibly including the availability of seats), capable of receiving the image signals t1, t2, . . . , tn and possibly the occupancy signals s1, s2, . . . , sn, transmitted by recorder CAM, and sensor SS2, respectively. Processor ECU is designed to process the image signals, and possibly the occupancy signals, and to transmit signals or data a1, a2, . . . , an indicating the space available to passengers (possibly including the availability of seats), associated with a section of the train, a predetermined car of the train, for example car C or an area of a car, if it has several access points.

The system is completed with display D showing the availability of free space for passengers (possibly including seats), which are capable of receiving signals or data a1, a2, . . . , an indicating the space available to passengers (possibly including the availability of seats) associated with areas of the train, with cars C of the train or predetermined car areas, and providing signaling of free space availability to passengers (possibly including seats) or signaling of the unavailability of free space (possibly including seats) for each predetermined section of the train, for example at the access doors.

Said display D are arranged for providing in a visible way the result of an elaborative process performed at a central server or in the cloud, resulting from an integration of different types of calculation algorithms explained in the following.

The percentage of available/not available space on a train, a car and/or sections of a car is calculated based on: data detected in real time through the recorder, historical/statistical data based on a predetermined periodicity (day of the week, month, hour) and influencing events such as weather events, feast days, happenings and everything that may affect the use of public and/or private transporting means.

The availability of space, in real time, is obtained owing to the processing of the images recorded by the recorder CAM that are present in the train, car and/or section of car when the train leaves from a stop and/or station X-1 with respect to stop and/or station X at which an access indication shall be issued.

Said images are integrated with the historical/statistical data of outgoing flows of users travelling with said transport. Calculation is performed by an algorithm trained to learn, by a machine learning method, the behaviour of users flow so as to give even more precise and improved results over time. In case from the first time further data relating to the forecast of outgoing users flows are available, these data will be used for improving the algorithm.

Figure 2A:
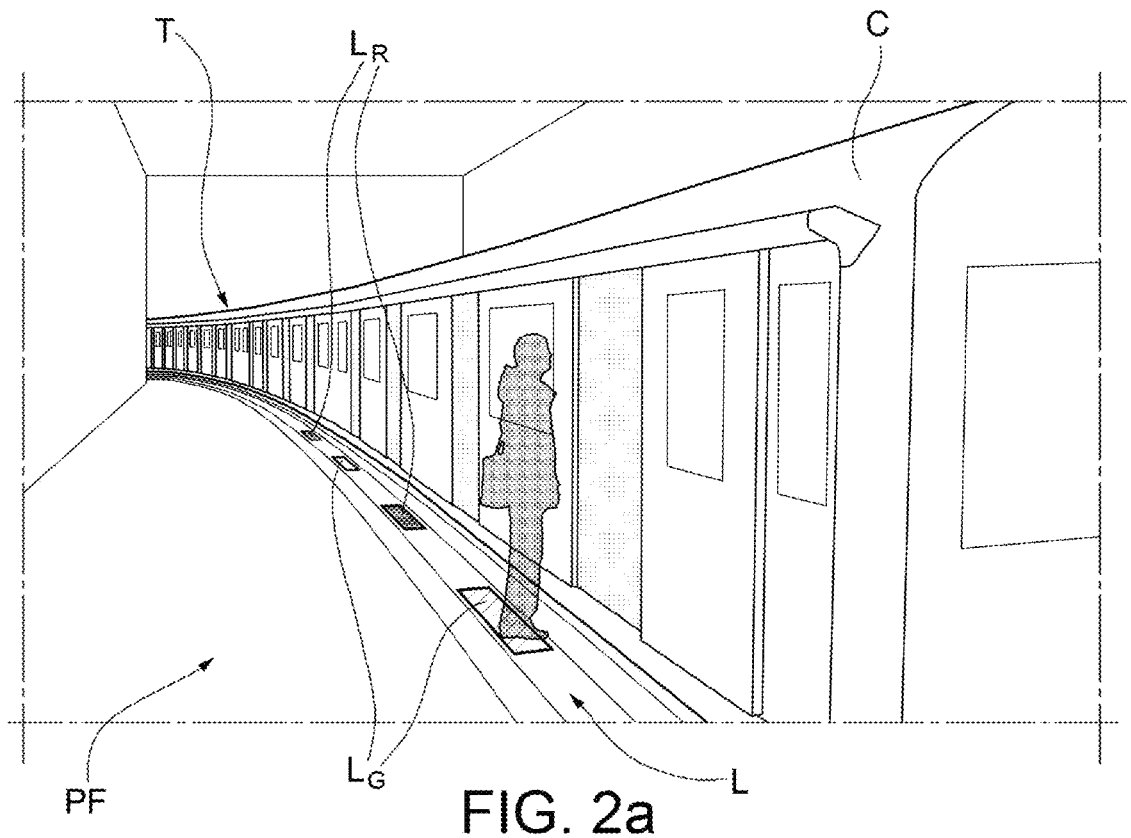
FIGS. 2a, 2b, 2c, 2d, 2e and 2f show scenarios representing various methods for signalling the availability of free space or seats to passengers in a train.

In a first aspect shown in FIG. 2a, display D showing the availability of free space (possibly including seats) include light sources (for example, LEDs) L built into the floor or ceiling of platform PF of each stop station of a transportation line traveled by the train. The light sources are preferably placed at the expected locations of the openings in the cars of the train and are capable of lighting up according to a different first or second mode, such as with two different colors, preferably the color green (LG) to indicate the availability of free space or seats, or the color red (LR) to indicate the unavailability of free space or seats.

Figure 2B:
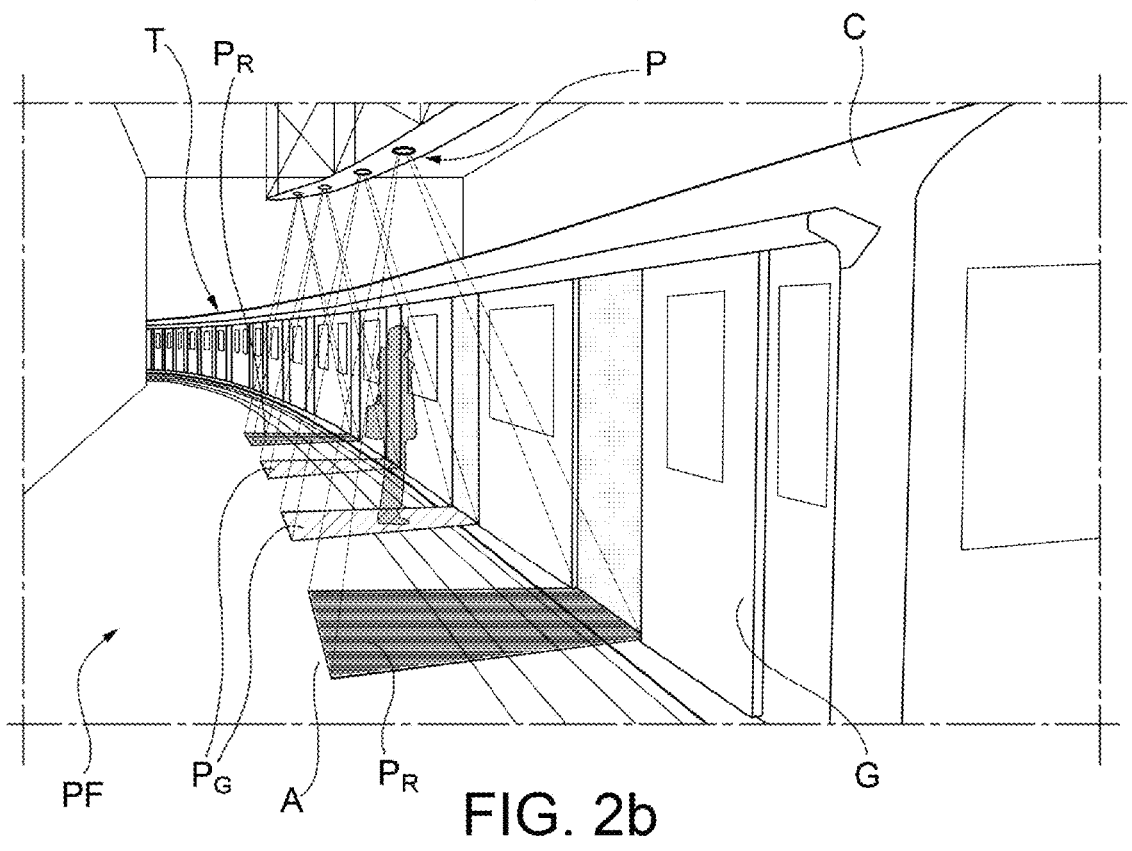

In a second aspect shown in FIG. 2b, display D for showing the availability of free space (possibly including seats) include projector P capable of illuminating a predetermined projection area A at the expected location of the openings in the cars of the train according to a different first or second mode, for example in two different colors, preferably the color green (PG) to indicate the availability of free space or seats, or the color red (PR) to indicate the unavailability of free space or seats.

Projector P are preferably placed on the ceiling of the platform of each stop station on a transportation line traveled by the train, and projection area A is the floor of platform PF of the stop station or doors G for accessing the cars in the train.

Figure 2C:
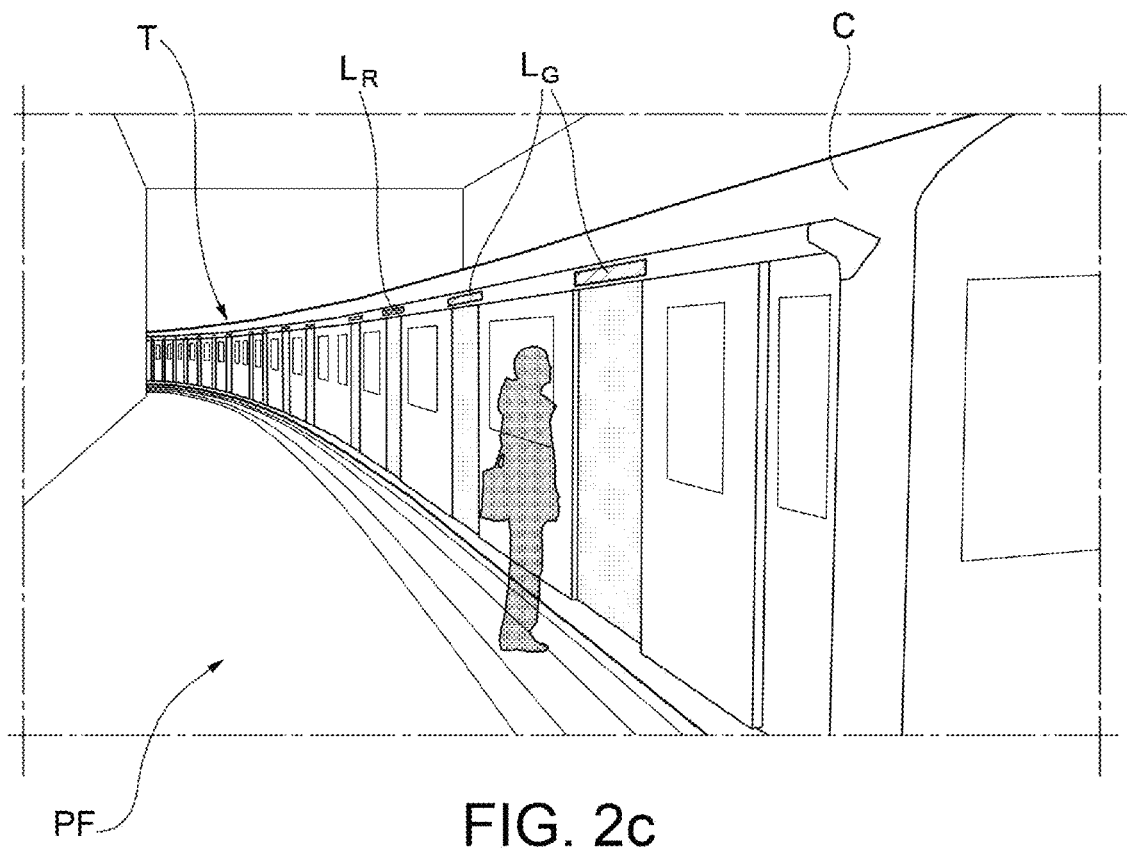

In a third aspect shown in FIG. 2c, display D for showing the availability of free space (possibly including seats) include light sources L' built into the outside wall of the cars in the train in the location of the access doors of the cars, which are capable of lighting up according to a different first or second mode, for example in two different colors, preferably the color green (LG') to indicate the availability of free space or seats, or the color red (LR') to indicate the unavailability of free space or seats.

Figure 2D:
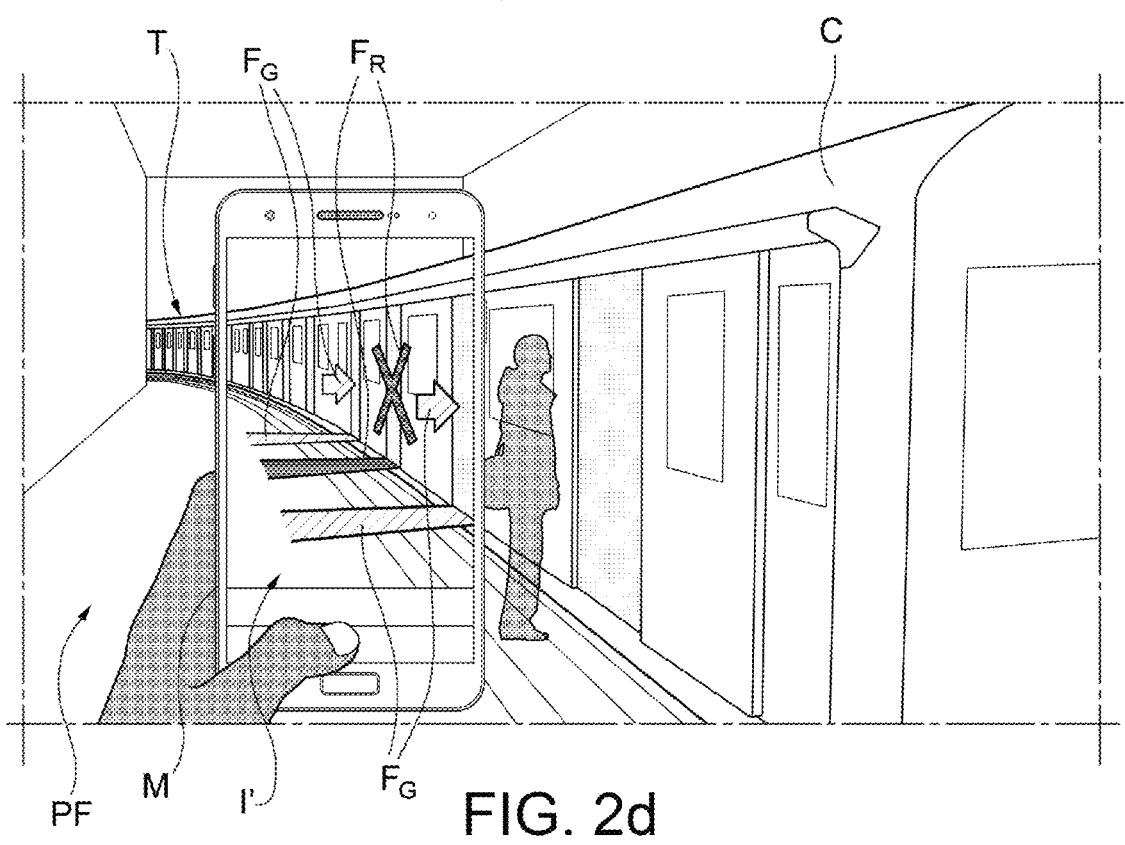

In a fourth aspect shown in FIG. 2d, display D for showing the availability of free space (possibly including seats) include an augmented reality image I' that can be displayed on a screen of a personal mobile communication device M when a camera of the device frames a scene of a stop station on the transportation line. Augmented reality image I' includes a graphic representation F using a different first or second mode superimposed on an image area representing platform PF of a stop station. In this aspect as well, the different representation modes consist, for example, of two different colors, preferably the color green (FG) to indicate the availability of free space or seats, or the color red (FR) to indicate the unavailability of free space or seats. There may be various types of graphic representation; for example, it can be a colored area or a pictogram superimposed on the floor of the stop station platform, or on the entrance doors of the cars in the train. The figure shows, as an example, a representation in which the availability of free space or seats is indicated with a green colored platform area facing an entrance door and a green arrow pictogram indicating the entrance door and possibly presenting a number indicating the available spots in the car section accessed by said door, or a red colored platform area facing an entrance door and a red X pictogram on the entrance door to indicate the absence of free space or seats.

Figure 2E:
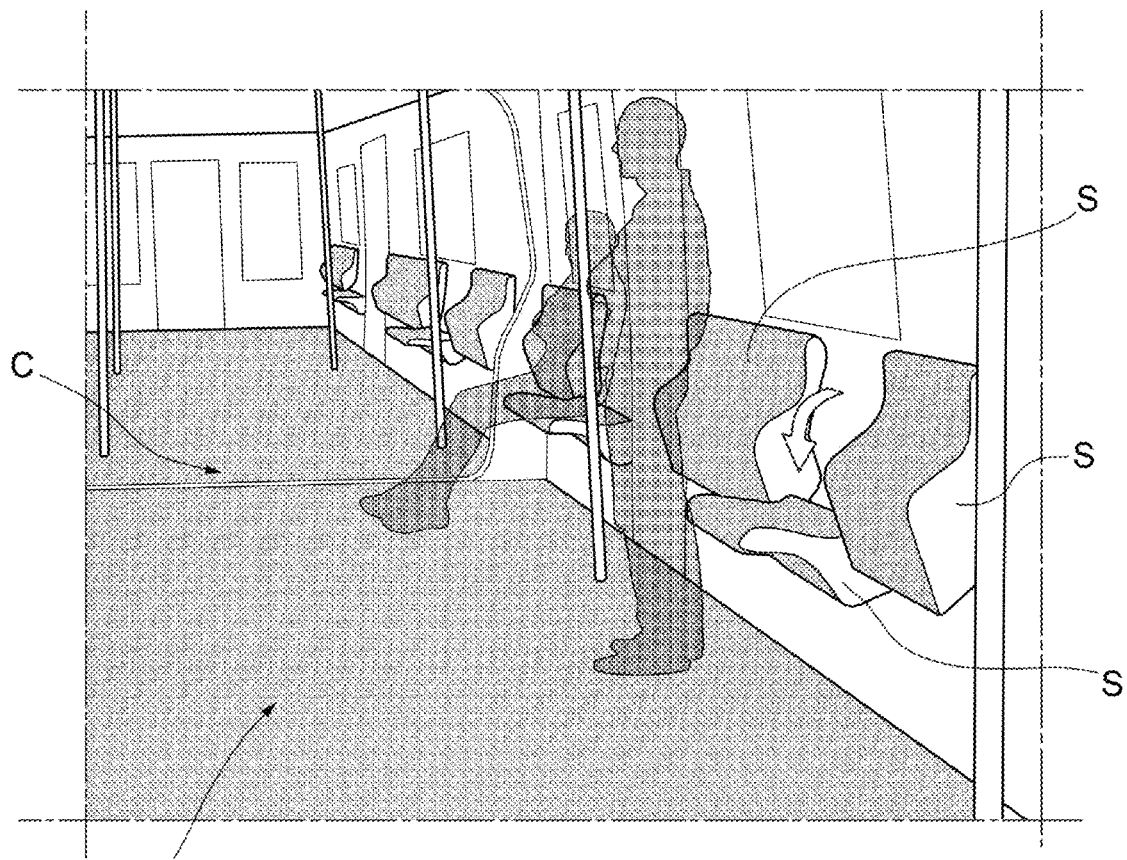
Figure 2F:
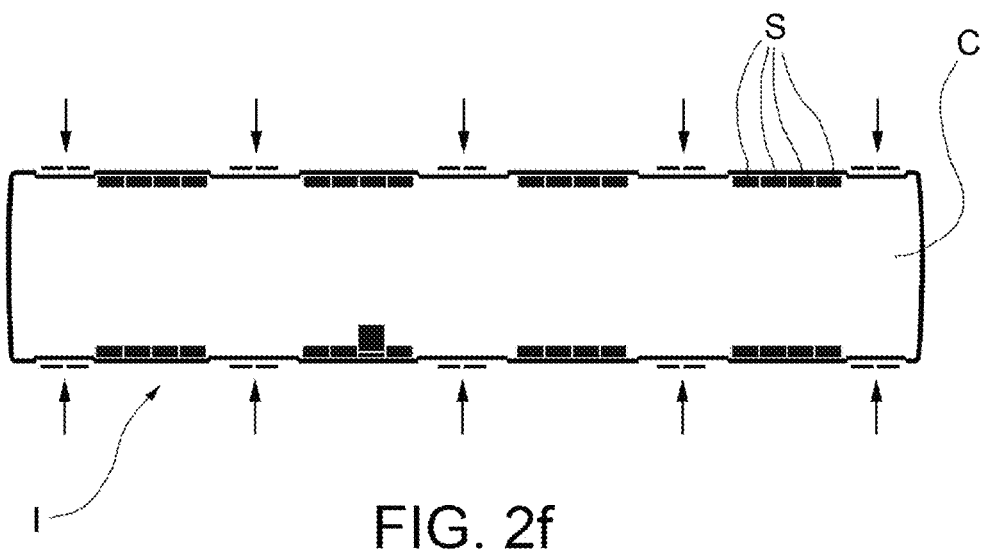

In a fifth aspect shown in FIGS. 2e and 2f, display D showing the availability of free space (possibly including seats) include an image I which can be displayed on a screen of a personal mobile communication device M, including a representation of the inside of the cars in the train approaching the station, for example an image of the actual representation (FIG. 2e) of the inside of the cars is captured, or a schematic representation (FIG. 2f) of the inside of the car is captured. Preferably, image I (which can be displayed with scrolling, for example, on a screen of reduced size) includes a representation of all cars C and an indication of the passenger's location in the stop station in relation to the locations of the cars in the train, or a representation of the cars whose expected location corresponds to the location of the device on the platform of the stop station.

For all five aspects a third light source may be advantageously included which is adapted to light up with a different colour, e.g. orange, if an occupancy percentage of the car is calculated that is comprised between the availability of free space (green light) or its absence (red light). In this case, availability of free space for passengers means occupancy of the available space (possibly comprising availability of seats) lower than 50% and absence of free space for passengers means occupancy of the available space (possibly comprising availability of seats) greater than 75%, whereby the orange lighting mode is implemented for an occupancy of the available space (possibly comprising availability of seats) comprised between 50% and 75%.

Advantageously, the system is capable of optimizing and modulating the use of the interior space of the cars by potentially limiting the possibility of using seats during more crowded times, thus making more free space available to standing passengers.

In addition to showing a passenger the possible access points of a transportation train so as to make use of the availability of free space or seats, the system of the present disclosure also offers a passenger the possibility of reserving a seat in an enriched aspect.

Figure 3:
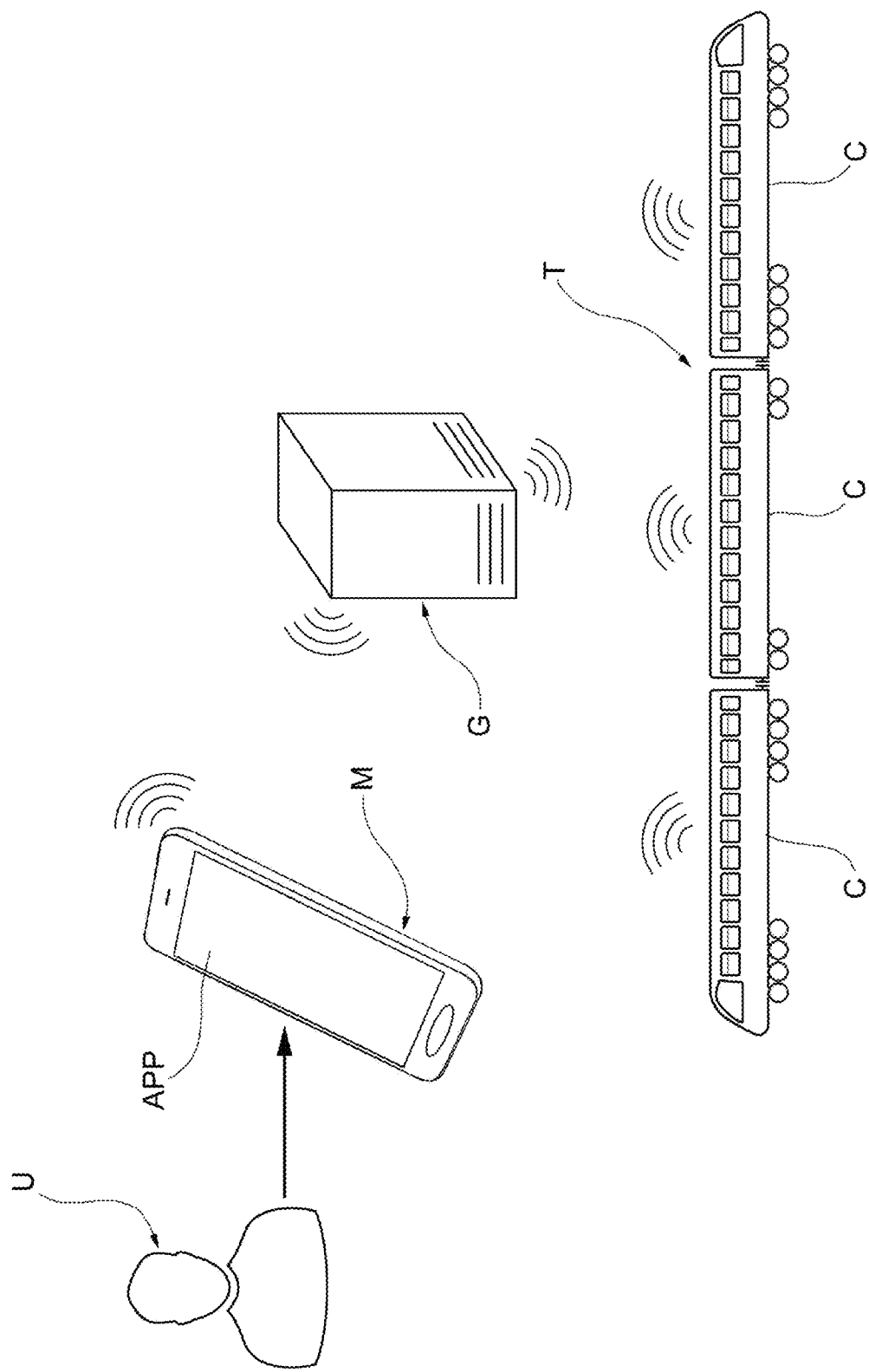
FIG. 3 shows a schematic diagram of the interaction between a user and the management system of the present disclosure for reserving a seat.

FIG. 3 shows a schematic drawing of a passenger U in possession of a personal mobile communication device M containing a software application which, when running, generates an APP information environment providing the passenger with interface functions (for example, login and/or access) for interfacing with a transportation service having a system for managing space available to passengers according to this present disclosure. Device M is provided with data entry such as, for example, a touch screen, command keys, image capturing equipment, voice recognition equipment, or devices for biometric feature recognition, so as to allow, for example, a first piece of identification data of the user's subscription credentials to be entered, if the service is reserved for subscribed users, and for entering at least one reservation request for a seat, showing the availability of free space or the location of the reserved seat, and, in the latter case, switching a seat structure from a first retracted configuration, not accessible to passengers, to a second deployed configuration accessible to the passenger.

Using the APP information environment, it is substantially possible to select and reserve a seat from the available ones in a given car of a given train and at a given time.

Personal mobile communication device M is capable of executing a process of locating its current position and is set up to transmit this position information together with a reservation request for a seat along with any accessory information (desired time for using the seat, service subscription identification code, etc.) and showing an image I on its screen, including a representation of the train and the location of the reserved seat in the train.

FIG. 3 shows a known type of telecommunications link (for example, over a UMTS or LTE network) between personal mobile communication device M and an electronic management platform G which, in broad strokes, includes for instance a computer workstation or a known type of server having a processing subsystem, a possible display device, and possible means of entering data and commands for a human operator, and is linked to (or integrated with) a data bank comprising a map of the available seats in each train of the transportation system to which the present disclosure applies.

Management platform G is designed to run one or more computer programs stored locally or accessible on the network, which check and communicate the availability of free space and possibly manage the temporary assignment of a seat to the passenger making such a request, as a function of the availability of seats in a train and possibly the location of passengers on the platform of a stop station.

In order to ensure more space and greater capacity inside the cars of a train, seats in the cars are positioned along the walls of the cars and have a structure capable of assuming a first retracted configuration, i.e. not accessible to passengers, and a second deployed configuration, i.e. accessible to passengers.

As an example, the seats have a structure including a seat bottom that can be folded against a wall of the car in the train when in the retracted configuration, which is not accessible to passengers, or an inflatable seat bottom housed in a seat built into a wall of the car in the train in the retracted configuration.

The retracted configuration of a seat structure, which is not accessible to passengers, is preferably locked and designed to switch to the deployed configuration based on a command issued via a seat reservation environment of the APP information environment.

In this aspect, the use of a seat is only allowed in the case of reservation and only when the passenger enters the car in the train where the reserved seat is located, once the seat structure has been unlocked (opening or inflation of the seat bottom) via the APP information environment. For example, each seat is equipped with a light element, such as an LED, capable of providing a visual indication to a passenger of where to sit. Upon entering the car, the passenger will know where to go and other passengers will be aware that the specific seat has been reserved. Upon arriving at the reserved seat, by means of the information environment and a corresponding command, the passenger will issue a command to the seat structure for the seat structure to switch from the first retracted configuration, not accessible to passengers, to the second deployed configuration, which is accessible to passengers holding the corresponding reservation.

Advantageously, the described computing environment may include other functionalities, such as:
  suggestions of routes for reaching a preset destination,
  real-time information on train composition, stop stations, and possible traffic congestion,
  presentation (possibly interactive) of tourist, cultural, and wine-and-dine itineraries with the possibility of reserving a virtual or real guide,
  presentation of information on events or services in a territorial area associated with a transportation line served by a transportation train,
  the possibility of accessing product or service purchase offers from businesses or service providers at preferential prices,
  a possible communication service dedicated to users of the application.

It must be noted that the aspect proposed in this disclosure in the foregoing discussion merely serves as a non-limiting example of aspects of the disclosure. A person skilled in the art could easily implement the present disclosure in different aspects which nevertheless do not differ from the principles presented here, and are therefore included in the scope of protection of the methods and systems defined by the enclosed claims.

The described solution can be implemented to manage free space for both standing passengers and for seats, or just to manage free space for standing passengers. Indeed, it would be clear to a person skilled in the art that each individual component relating to a specific function of the system of the disclosure, described and illustrated in the figures in reference to an aspect exemplified as a whole, may be implemented independently of the others and, as such, claimed independently, and any lack of implementation of the other components will not jeopardize the effectiveness thereof.

The invention claimed is:

1. A system for managing space available and seats for passengers in a passenger transportation system comprising at least one passenger transportation train including a plurality of cars, each having a corresponding predetermined number of seats, set up to travel between stop stations in a transportation network within a predetermined territory, said system comprising:
  a sensor configured to determine the occupancy of space available to passengers associated with each car in the plurality of cars of said at least one transportation train, wherein the sensor is configured to transmit corresponding occupancy signals of the space available in a car;

a processor configured to manage space available to passengers capable of receiving said occupancy signals of the space available in a car from said sensor and configured to transmit signals or data indicating the space available to passengers, associated with corresponding predetermined sections of said train; and a display configured to display the availability of free space for passengers, configured to receive said signals or data indicating the space available to passengers, associated with corresponding predetermined sections of said train, and configured to signal the availability of free space for passengers or configured to signal the unavailability of free space for passengers in connection with each said predetermined section of the train, wherein said display includes light sources built into a floor or ceiling of the platform of the stop station at the expected location of the doors of the cars in the train, said light sources being capable of lighting up in at least a different first or second mode.

2. A system according to claim 1, in which said display includes a projector configured to illuminate a predetermined projection area corresponding to the expected location of the doors of the cars in the train in a different first or second mode.

3. A system according to claim 2, in which said projector is placed in the ceiling of the platform of the stop station and said projection area is the floor of the platform of the stop station.

4. A system according to claim 2, in which said projector is placed in the ceiling of the platform of the stop station and said projection area consists of the doors of the cars in the train.

5. A system according to claim 1, in which said display includes light sources built into the outside walls of the cars in the train at the expected location of the doors of the cars in the train, with said light sources configured to light up in at least a different first or second mode.

6. A system according to claim 1, in which said display includes an augmented reality image which can be displayed on a screen of a personal mobile communication device, which includes a graphic representation in a different first or second mode superimposed over an image area representing the platform of the stop station.

7. A system according to claim 6, comprising a user-interface computing environment designed as an application residing on a personal mobile communication device of a user, set up to receive said signals or data indicating the space available to passengers associated with corresponding predetermined sections of said train, and for displaying said augmented reality image.

8. A system according to claim 7, in which said computing environment is configured to signal available seats.

9. A system according to claim 7, in which said computing environment has a seat reservation environment.

10. A system according to claim 1, in which said display is configured in at least a different first or second mode, wherein said different modes are different colours.

11. A system according to claim 1, in which said display includes an image which can be displayed on a screen of a personal mobile communication device, which includes an actual representation of the inside of the cars in the train approaching the station and an indication of the location of the user in the stop station in relation to the location of the cars in the train.

12. A system according to claim 1, in which said sensor includes at least one recorder configured to record at least the inside of the car and sensors configured to detect seat occupancy, and said available space in a car includes at least one of either a space available for standing passengers or seats.

13. A system according to any claim 1, in which said seats are placed along the perimeter walls of the cars in the train and have a structure configured to assume a first retracted configuration not accessible to passengers and a second deployed configurations accessible to passengers.

14. A system according to claim 13, in which said first retracted configuration is locked and said seat structure is designed to switch to said deployed configuration based on a command issued via a seat reservation computing environment.

15. A system according to claim 13, in which said seats have a structure including a seat bottom that can be folded against a wall of the car in the train when in the aforementioned retracted configuration.

16. A system according to claim 13, in which said seats have a structure including an inflatable seat bottom housed in a seat built into a wall of the car in the train when in the retracted configuration.

* * * * *